United States Patent
McColloch

(10) Patent No.: US 9,470,860 B2
(45) Date of Patent: Oct. 18, 2016

(54) METHODS AND SYSTEMS FOR IMPROVING HEAT DISSIPATION, SIGNAL INTEGRITY AND ELECTROMAGNETIC INTERFERENCE (EMI) SHIELDING IN OPTICAL COMMUNICATIONS MODULES

(71) Applicant: Avago Technologies General IP (Singapore) Pte. Ltd., Singapore (SG)

(72) Inventor: Laurence R. McColloch, Santa Clara, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 76 days.

(21) Appl. No.: 14/620,291

(22) Filed: Feb. 12, 2015

(65) Prior Publication Data
US 2016/0238805 A1 Aug. 18, 2016

(51) Int. Cl.
G02B 6/42 (2006.01)
(52) U.S. Cl.
CPC .............. *G02B 6/4268* (2013.01); *G02B 6/428* (2013.01); *G02B 6/4257* (2013.01); *G02B 6/4277* (2013.01)
(58) Field of Classification Search
None
See application file for complete search history.

(56) References Cited

U.S. PATENT DOCUMENTS

| 7,478,953 | B2 | 1/2009 | Tanaka |
| 7,941,053 | B2 | 5/2011 | Dallesasse |
| 8,351,794 | B2 | 1/2013 | Meadowcroft et al. |
| 8,807,846 | B2 | 8/2014 | Hung et al. |
| 2012/0299166 | A1* | 11/2012 | Minamio ............. B21D 39/032 257/666 |
| 2013/0156418 | A1 | 6/2013 | Stapleton et al. |
| 2015/0000395 | A1* | 1/2015 | Tashiro ................. F02D 41/182 73/204.26 |

OTHER PUBLICATIONS

"Optical Module Works 4," ChinaSFP.com, www.chinasfp.com, Sep. 4, 2012, 4 pages.
"XFP Connector and Cage Assembly," TE Connectivity, Oct. 11, 2011, 14 pages, Application Specification 114-13096 Rev G, Tyco Electronics Corporation, a TE Connectivity Ltd. Company.

\* cited by examiner

*Primary Examiner* — Tina Wong

(57) ABSTRACT

An optical communications module is provided that has improved heat dissipation, signal integrity and/or EMI shielding solutions. The heat dissipation solution thermally decouples the light source driver circuitry from the light source such that heat generated by the light source driver circuitry does not increase the temperature of the light source to the point that its performance is degraded. The heat dissipation solution may also include convective heat transfer features for further improving heat dissipation. The EMI solution includes features that increase the number of contact points between the outer surface of the module housing and EMI fingers of a cage that receives the module. The signal integrity solution includes features that reduce inductive coupling to improve impedance matching between electrical interconnections, thereby improving signal integrity.

34 Claims, 13 Drawing Sheets

METHODS AND SYSTEMS FOR IMPROVING HEAT DISSIPATION, SIGNAL INTEGRITY AND ELECTROMAGNETIC INTERFERENCE (EMI) SHIELDING IN OPTICAL COMMUNICATIONS MODULES

TECHNICAL FIELD

The invention relates to optical communications modules. More particularly, the invention relates to an optical communications module having improved signal integrity, heat dissipation and electromagnetic interference (EMI) shielding characteristics.

BACKGROUND

A variety of optical communications modules exist for transmitting and/or receiving optical data signals over optical waveguides (e.g., optical fibers). Optical communications modules include optical receiver modules, optical transmitter modules and optical transceiver modules. Optical receiver modules have one or more receive channels for receiving one or more optical data signals over one or more respective optical waveguides. Optical transmitter modules have one or more transmit channels for transmitting one or more optical data signals over one or more respective optical waveguides. Optical transceiver modules have one or more transmit channels and one or more receive channels for transmitting and receiving respective optical transmit and receive data signals over respective transmit and receive optical waveguides.

For each of these different types of optical communications modules, a variety of designs and configurations exist. A typical layout of an optical communications module includes a module circuit board, such as a printed circuit board (PCB), a ball grid array (BGA), or the like, and various electrical components and optoelectronic components mounted on the module circuit board. In the case of an optical transmitter module, one or more light sources such as laser diodes or light-emitting diodes (LEDs) and one or more driver integrated circuits (ICs) are mounted on the module circuit board and electrically interconnected with it.

Similar configurations are used for optical receiver modules, except that the module circuit board has one or more light detectors instead of light sources mounted on it and has a receiver IC instead of a driver IC mounted on it. Optical transceiver modules typically have one or more light sources, one or more light detectors, a light source driver IC, and receiver IC mounted on the module circuit board.

Optical communications modules of the type described above are sometimes mounted directly on the module PCB, but sometimes the modules are mounted on a separate secondary PCB sometimes called a "daughter card." These secondary PCBs are sometimes incorporated into the packaging of other electronics used in the module, such as in the packaging of an application specific integrated circuit (ASIC). These secondary PCBs can be made of conventional PCB material or of a specialized, high performance material called "organic substrate."

The PCB often has a controller IC mounted on it that is in communication with the driver and/or receiver ICs through electrical conductors (traces and/or vias) of the PCB and electrical conductors (traces and/or vias) of the module circuit board in a design that has multiple PCBs. Bond wires are typically also used to make some of the interconnections between ICs and the PCB on which the ICs are mounted. One problem that can occur with this type of configuration is that the electrically-conductive pathways between components mounted on the PCB and components mounted on the sub-circuit boards are often so long that electrical errors can be introduced into the signal. Errors can include inductive or capacitive coupling between adjacent electrically-conductive pathways, or signal filtering that results from the inductance, capacitance and resistance of such paths. Such coupling or filtering can degrade signal integrity and overall performance, especially at higher data rates.

The PCB and the optical communications module mounted thereon are typically housed in a metal housing that is configured to be plugged, or inserted, into a metal cage. The metal cage is often held in a slot of a rack that has multiple slots for holding multiple cages. The PCB and sub-modules typically include one or more heat sink devices for dissipating heat generated by the electrical and optoelectronic components mounted thereon. The heat sink devices are typically thermal pads, lead frames or the metal housing on which the electrical and optoelectronic components are mounted. The electrical and optoelectronic components are typically attached to the heat sink devices by a thermally conductive material to enable heat generated by them to pass into and dissipate in the heat sink devices. The heat sink devices spread out the heat to move it away from the components.

Heat generated by the electrical and optoelectronic components can detrimentally affect the performance of the optical communications module. External heat dissipation structures are often mechanically coupled to the metal housings of the optical communications modules to allow heat generated by the electrical and optoelectronic components to be transferred from the module housing into the external heat dissipation structure. This helps lower the temperature inside of the module housing.

Because of an ever-increasing need to increase the bandwidth of optical links, efforts are constantly being made to increase the operating speeds or data rates of the laser diodes used in the modules. As the speeds of laser diodes are increased to achieve higher link data rates, their temperatures must be reduced. Increases in link length also require reductions in the temperatures of the laser diodes. In order to meet these needs, heat dissipation solutions should be highly effective at dissipating heat. If they are not, then the temperature of the laser diode may increase to the point that its performance is detrimentally affected. The heat dissipation solutions also need to be cost effective. Providing heat dissipation solutions for high-speed optical communications modules that are cost effective and effective at dissipating heat continues to be a challenge in the industry.

Another issue that needs to be addressed when designing optical communications modules is EMI shielding. In most optical communications modules, the receptacle that receives the optical connector disposed on the end of the optical fiber cable constitutes an EMI open aperture that allows EMI to escape from the module housing. The Federal Communications Commission (FCC) has set standards that limit the amount of electromagnetic radiation that may emanate from unintended sources. For this reason, a variety of techniques and designs are used to shield EMI open apertures in module housings in order to limit the amount of EMI that passes through the apertures. Various metal shielding designs and resins that contain metallic material have been used to cover areas from which EMI may escape from the housings. So far, such techniques and designs have had only limited success, especially with respect to optical communications modules that transmit and/or receive data at very high data rates (e.g., 10 gigabits per second (Gbps) and higher).

For example, EMI collars are often used with pluggable optical communications modules to provide EMI shielding. The EMI collars in use today vary in construction, but generally include a band portion that is secured about the exterior of the module housing and spring fingers having proximal ends that attach to the band portion and distal ends that extend away from the proximal ends. The spring fingers are periodically spaced about the collar and have folds in them near their distal ends that direct the distal ends inwardly toward the module housing. The distal ends make contact with the housing at periodically-spaced points on the housing. At the locations where the folds occur near the distal ends of the spring fingers, the outer surfaces of the spring fingers are in contact with the inner surface of the cage at periodically spaced contact points along the inner surface of the cage. Such EMI collar designs are based on Faraday cage principles.

The amount of EMI that passes through an EMI shielding device is proportional to the largest dimension of the largest EMI open aperture of the EMI shielding device. Therefore, EMI shielding devices such as EMI collars and other devices are designed to ensure that there is no open aperture that has a dimension that exceeds the maximum allowable EMI open aperture dimension associated with the frequency of interest. For example, in the known EMI collars of the type described above, the spacing between the locations at which the distal ends of the spring fingers come into contact with the inner surface of the cage should not exceed one quarter wavelength of the frequency of interest that is being attenuated. Even greater attenuation of the frequency of interest can be achieved by making the maximum EMI open aperture dimension significantly less than one quarter of a wavelength, such as, for example, one eighth or one tenth of a wavelength. However, the ability to decrease this spacing using currently available manufacturing techniques is limited. In addition, as the frequencies of optical communications modules increase, this spacing needs to be made smaller in order to effectively shield EMI, which becomes increasingly difficult or impossible to achieve at very high frequencies.

Accordingly, a need exists for an optical communications module configuration and method that provide improvements in heat dissipation, EMI shielding and signal integrity.

SUMMARY

The invention is directed to an optical communications module in which features may be implemented for improving heat dissipation, signal integrity and EMI shielding. In accordance with an embodiment, the optical communications module comprises upper and lower housing portions mechanically coupled with one another to provide a module housing, a first lead frame fixedly positioned in the module housing, a second lead frame fixedly positioned in the module housing and spatially separated from the first lead frame, at least a first light source driver circuit mounted on a first mounting surface of the first lead frame, at least a first light source mounted on the second lead frame, and at least a first electrical interconnection electrically interconnecting the first light source driver circuit and the first light source. A first air flow path flows across at least a portion of the first lead frame and a second air flow path that is isolated from the first air flow path flows across at least a portion of the second lead frame.

The spatial separation of the first and second lead frames from one another and direct cooling of the first and second lead frames provided by the air flow paths provide an effective heat dissipation solution for the module.

In accordance with another embodiment, the optical communications module comprises a module housing, a PCB fixedly positioned in the module housing, an organic substrate mounted on an upper surface of the PCB and electrically interconnected with the PCB, at least a first IC mounted on the upper surface of the organic substrate and electrically interconnected with the organic substrate, a lead frame fixedly positioned in the module housing, at least a first light source driver circuit mounted on a first mounting surface of the lead frame, at least a first light source mounted on a second mounting surface of the lead frame and electrically interconnected with the first light source driver circuit; and a plurality of electrically-conductive bonds having first ends that are connected to respective electrical contact pads of the organic substrate and having second ends that are connected to respective electrical contact pads of the light source driver circuit. The organic substrate has a plurality of electrical conductors therein and a plurality of electrical contact pads disposed on an upper surface thereof. The electrical contact pads of the organic substrate are connected to the electrical conductors of the organic substrate.

Using the organic substrate improves signal integrity by eliminating the need to use long wire bonds to electrically interconnect the PCB with the light source driver circuit.

In accordance with another embodiment, the optical communications module comprises a module housing that provides improved EMI shielding and module components disposed in the module housing. The module housing comprises a first housing portion and a second housing portion. The second housing portion is made of a metallic material having at least a first EMI structure formed therein. The first EMI structure comprises a plurality of grooves formed in an outer surface of the second housing portion. Each groove has first and second contact points on opposite sides thereof. The grooves have a width and position that are preselected to space the respective first and second contact points a predetermined distance apart such that when the module housing is lodged in an opening formed in a metal cage, each of a plurality of EMI fingers of the metal cage are contact with a respective pair of the first and second contact points.

The grooves formed in the outer surface of the module housing increase the density of contact points per EMI finger, which improves EMI shielding.

These and other features and advantages of the invention will become apparent from the following description, drawings and claims.

DETAILED DESCRIPTION OF AN ILLUSTRATIVE EMBODIMENT

Figure 1:
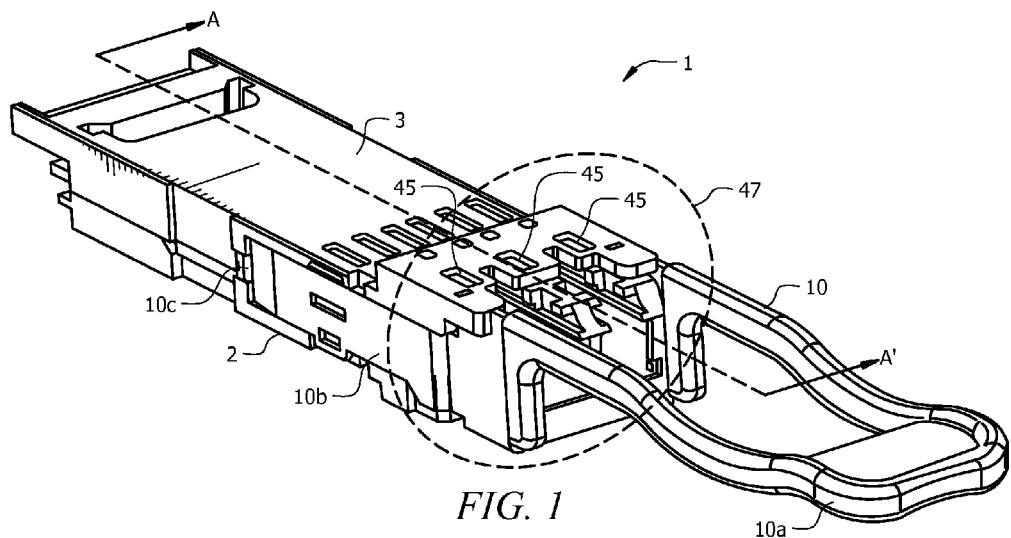
FIG. 1 illustrates a top perspective view of an optical communications module in accordance with an illustrative embodiment.

In accordance with illustrative, or exemplary, embodiments described herein, an optical communications module is provided that has features, elements or components that improve heat dissipation, signal integrity and EMI shielding. Illustrative embodiments of the optical communications module are described herein with reference to the figures, in which like reference numerals represent like elements, features or components. It should be noted that features, elements or components in the figures are not necessarily drawn to scale, emphasis instead being placed on demonstrating principles and concepts of the invention.

FIG. 1 illustrates a top perspective view of an optical communications module 1 in accordance with an illustrative embodiment having features for improving heat dissipation, signal integrity and EMI shielding. It should be noted that although the optical communications module 1 is described herein as having all of these features, it is not necessary for all of these features to be implemented together in an optical communications module. Rather, an optical communications module in accordance with the invention implements one or more of these features, or of similar features not explicitly described herein that incorporate the principles and concepts of the invention described herein.

The optical communications module 1 has a lower, or first, housing portion 2 and an upper, or second, housing portion 3. In accordance with an illustrative embodiment, the lower housing portion 2 is made of molded plastic material and the upper housing portion 3 is made of a cast metallic material, although other materials and processes may be used to make the lower and upper housing portions 2 and 3. As will be described below in more detail with reference to FIG. 8, the housing portions 2 and 3 have pivot and snap features that allow them to be temporarily coupled together and held in place while an adhesive material is placed in contact with the housing portions and cured to fixedly secure them together.

The optical communications module 1 has a latching/delatching mechanism 10 that includes a push/pull member 10a and arms 10b that extend along portions of opposite sides of the upper housing portion 3. The push/pull member 10a is adapted to be used by a person to push, or insert, the module 1 into an opening of a cage (not shown) and to pull, or extract, the module 1 from the cage opening. Only one of the arms 10b is visible in FIG. 1. The arms 10b have outwardly protruding tabs 10c disposed on their ends that push outwardly against the cage when a person pulls on the push/pull member 10a to delatch the module 1 from the cage.

Figure 2:
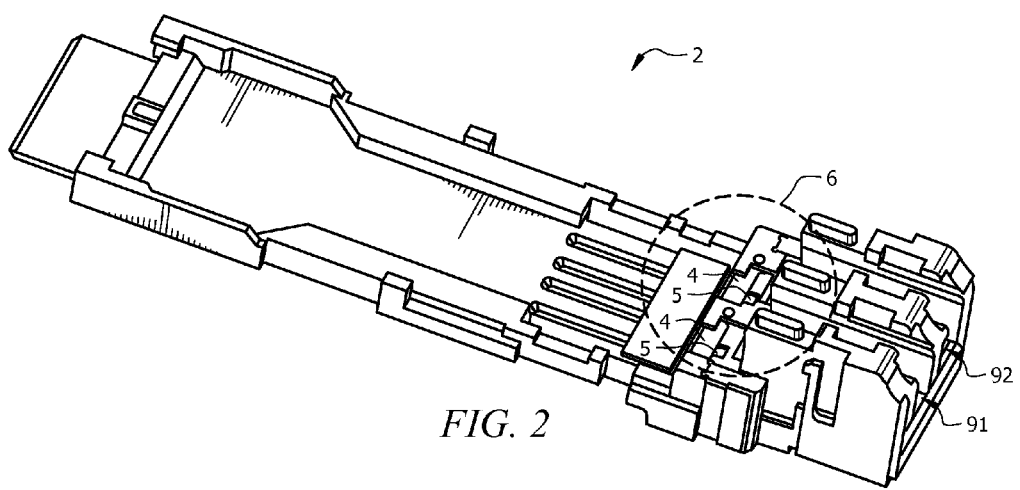
FIG. 2 illustrates a top perspective view of a lower housing portion of the optical communications module shown in FIG. 1 having first and second lead frames embedded therein.
Figure 3:
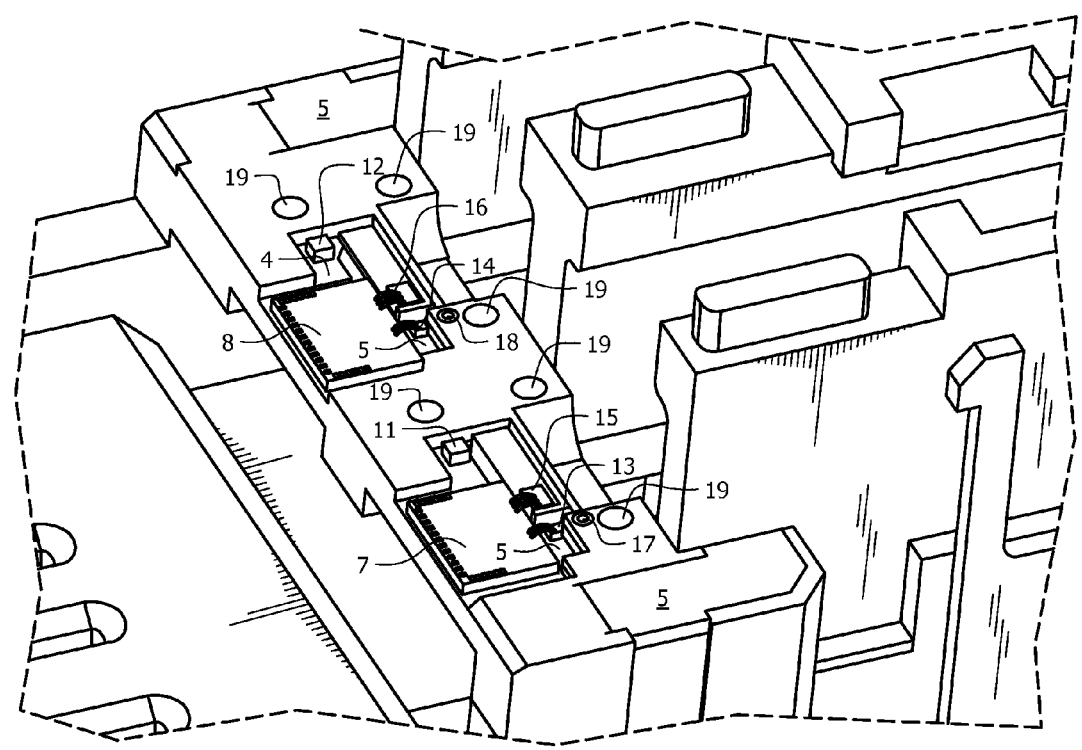
FIG. 3 illustrates an enlarged view of the area shown in FIG. 2 inside of the dashed circle labeled with reference numeral 6 and further illustrating first and second driver ICs mounted on the first lead frame.

FIG. 2 illustrates a top perspective view of the lower housing portion 2 of the optical communications module 1 shown in FIG. 1 having first and second metallic lead frames 4 and 5 embedded therein on which electrical or optoelectronic components are mounted. The first and second lead frames 4 and 5 may be considered first and second lead frame portions of a module lead frame. FIG. 3 illustrates an enlarged view of the area inside of the dashed circle 6 shown in FIG. 2. In accordance with this illustrative embodiment, the first and second lead frames 4 and 5 (FIGS. 2 and 3) are spatially separated from one another by the plastic of the lower housing portion 2 and by air gaps. The air gaps and plastic that provide the spatial separation thermally decouple the first and second lead frames 4 and 5 from one another and thermally decouple the components mounted on the first lead frame 4 from the components mounted on the second lead frame 5. First and second driver ICs 7 and 8 (FIG. 3), respectively, and first and second feedback monitoring diodes 11 and 12 (FIG. 3), respectively, are mounted on, and die attached to, the first lead frame 4 (FIG. 3).

First and second laser diodes 13 and 14 (FIG. 3) are mounted on, and die attached to, the second lead frame 5 (FIG. 2). First and second P-intrinsic-N (PIN) diodes 15 and 16 (FIG. 3), respectively, are mounted on, and die attached to, the second lead frame 5 beside the first and second laser diodes 13 and 14, respectively. First and second fiducial features 17 and 18 (FIG. 3) are formed in the plastic of the lower housing portion 2 for use by a machine vision system (not shown) to mount the first and second laser diodes 13 and 14 and the first and second PIN diodes 15 and 16 at precise predetermined locations on the second lead frame 5. The driver ICs 7 and 8 also include receiver circuitry for processing electrical signals produced by the PIN diodes 15 and 16. Holes 19 are formed in the plastic of the lower housing portion 2 for receiving pins (not shown) of first and second optics devices (not shown) during the process of mounting the first and second optics devices on the lower housing portion 2.

Making the lower housing portion 2 out of plastic and spatially separating the first and second lead frames 4 and 5 from one another provides advantages in terms of heat dissipation. The first lead frame 4 operates as a mounting surface and as a heat spreader for spreading and dissipating heat generated by the driver ICs 7 and 8 and by the feedback monitoring diodes 11 and 12. The driver ICs 7 and 8 are the primary sources of heat generation in the module 1. The lead frame 5 acts as a mounting surface and as a heat spreader for spreading and dissipating heat generated by the laser diodes 13 and 14 and by the PIN diodes 15 and 16. The spatial separation of the lead frames 4 and 5 from one another prevents heat generated by the driver ICs 7 and 8 from raising the temperatures of the laser diodes 13 and 14. The laser diodes 13 and 14 are extremely sensitive to temperature and their operating temperatures generally have to be lowered as the operating speeds are increased. As indicated above, the plastic of the lower housing portion 2 and the separation between the first and second lead frame portions 4 and 5 thermally decouple the first and second lead frames 4 and 5 from one another. This prevents thermal crosstalk from occurring between the lead frames 4 and 5 and between the devices mounted on them.

Another advantage of making the lower housing portion 2 out of plastic is that parts formed by plastic molding processes can be made with very high precision. In accordance with an illustrative embodiment, the lower housing portion 2 is made by an insert molding process. Using an insert molding process to make the plastic lower housing portion 2 ensures that features of the lower housing portion 2 are formed with high precision. For example, the fiducial features 17 and 18 are precisely shaped, sized and positioned in the lower housing portion 2 to ensure that the laser diodes 13 and 14 and the PIN diodes 15 and 16 are precisely positioned and oriented on the lead frame 5.

While the use of a plastic lower housing portion 2 having spatially separated lead frames 4 and 5 embedded therein eliminates, or at least reduces, thermal cross-talk and prevents heat generated by the driver ICs 7 and 8 from raising the temperatures of the laser diodes 13 and 14, the module 1 also includes heat dissipation features for removing heat from the module 1 through convection heat transfer, as will be described below in detail with reference to FIGS. 10 and 11.

Figure 4:
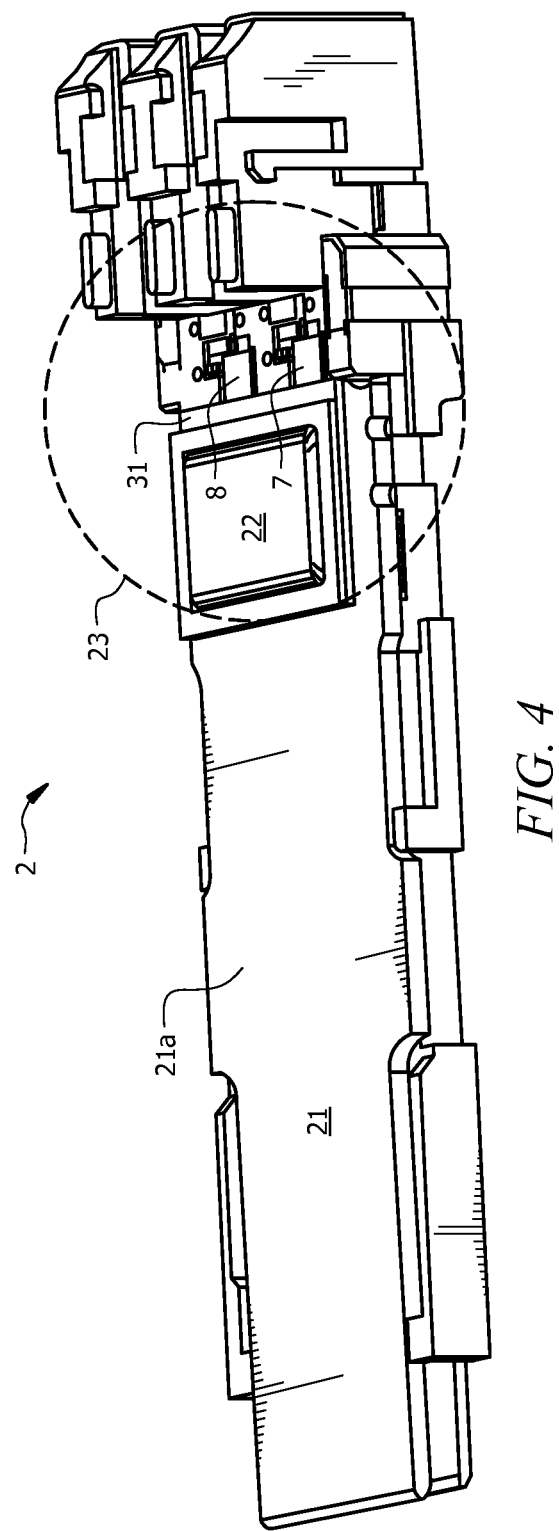
FIG. 4 illustrates a top perspective view of the lower housing portion shown in FIG. 2 having a PCB secured thereto that has an IC mounted on it.
Figure 5:
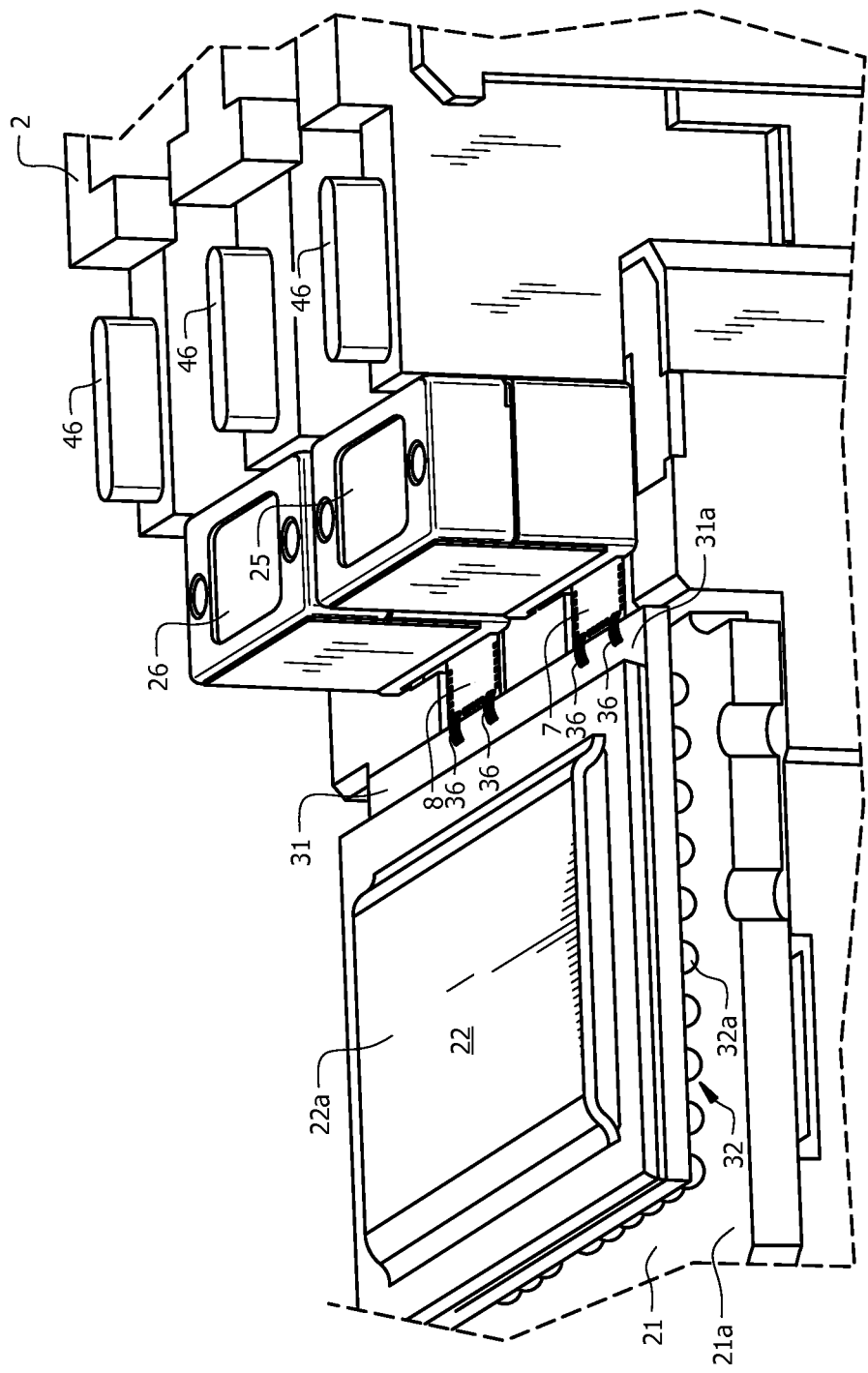
FIG. 5 illustrates an enlarged view of the area shown in FIG. 4 inside of the dashed circle labeled with reference numeral 23 and further illustrating first and second optics devices mounted on the lower housing portion.
Figure 6:
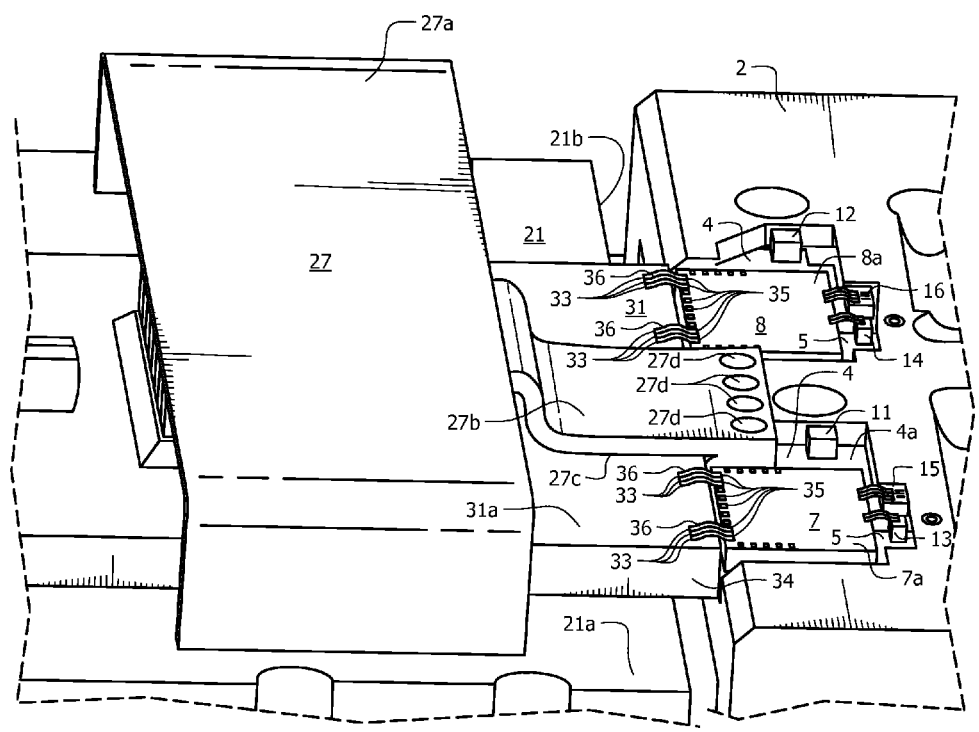
FIG. 6 illustrates a top perspective of the portion of the optical communications module shown in FIG. 5 with the first and second optics devices 25 and 26 removed and further including a leveling device.
Figure 7:
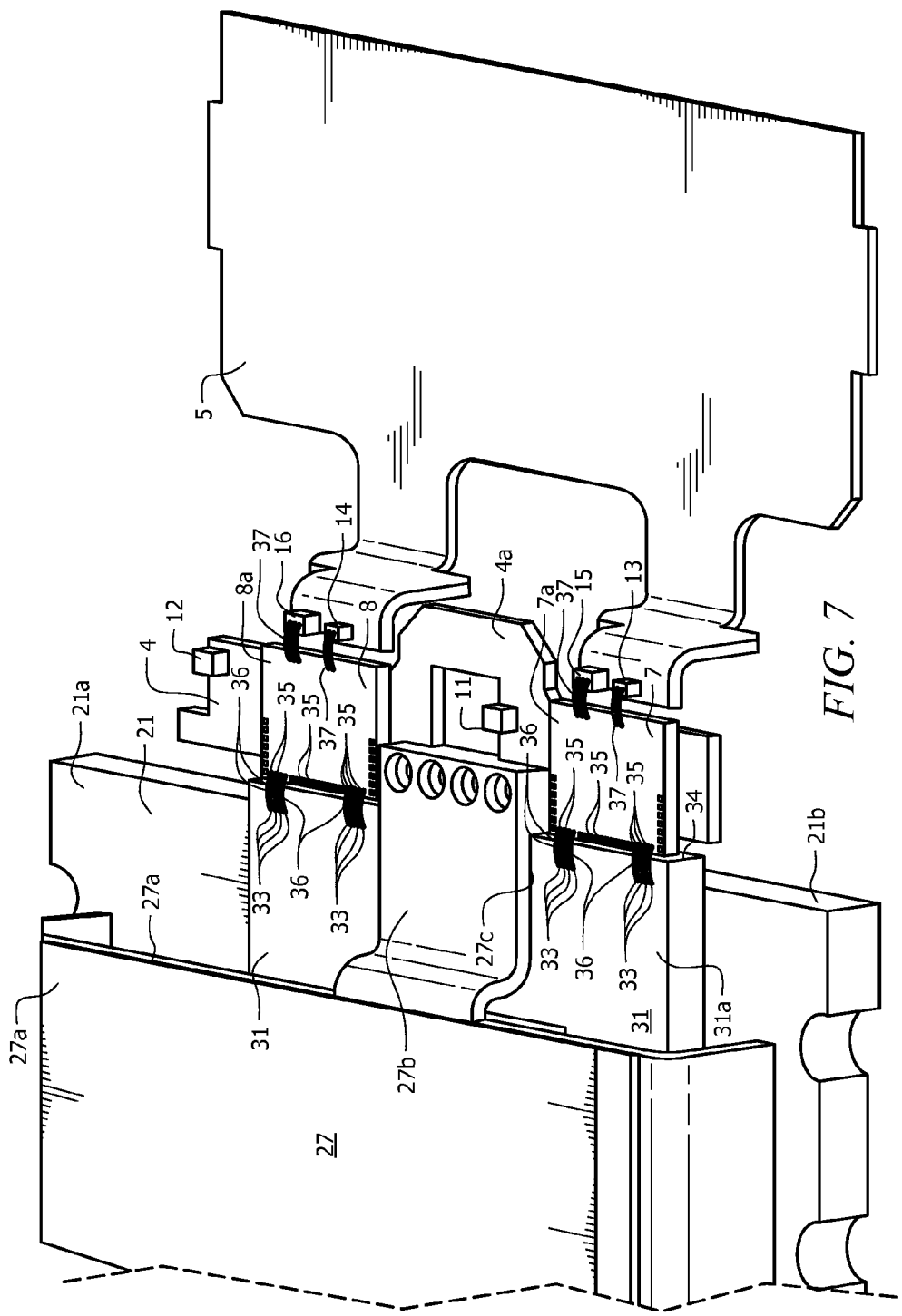
FIG. 7 illustrates a top perspective of the portion of the optical communications module shown in FIG. 6 with the lower housing portion 2 removed to better illustrate a spatial separation between the first and second lead frames.

FIG. 4 illustrates a top perspective view of the lower housing portion 2 shown in FIG. 2 having a PCB 21 secured thereto that has an ASIC package 22 mounted on an upper surface 21*a* thereof. FIG. 5 illustrates an enlarged view of the area shown in FIG. 4 inside of dashed circle 23, but also illustrates first and second optics devices 25 and 26 mounted on the lower housing portion 2 for coupling light between the module 1 (FIG. 1) and ends of respective optical fiber cables (not shown). FIG. 6 illustrates a top perspective view of the portion of the module shown in FIG. 5, but with the first and second optics devices 25 and 26 removed and further including a leveling device 27. FIG. 7 illustrates a top perspective of the portion of the module 1 shown in FIG. 6 with the lower housing portion 2 removed to better illustrate the spatial separation between the first and second lead frames 4 and 5.

The ASIC package 22 (FIGS. 4 and 5) may be, for example, a controller IC for controlling the operations of the driver ICs 7 and 8. The ASIC package 22 could be any type of IC package programmed or configured to perform any type of operations. In accordance with this illustrative embodiment, the ASIC package 22 is mounted on an organic substrate 31 (FIGS. 4-7). Organic substrates are known devices that are often fabricated using known semiconductor fabrication processes with improved accuracies over standard PCB processes. A typical organic substrate has electrical conductors (not shown) running through it, such as electrically-conductive lines and vias, that have a very small pitch (i.e., spacing) between them. Because organic substrates are commonly made using semiconductor fabrication processes, the pitch of the electrical conductors formed in an organic substrate can be very fine, i.e., they can be very close together. The conductor pitch in organic substrates can be much smaller than the conductor pitch in PCBs. In accordance with this illustrative embodiment, the organic substrate 31 has these attributes, which leads to improvements in signal integrity, as will be described below in more detail.

A ball grid array 32 (FIG. 5) disposed on a lower surface of the organic substrate 31 has electrically-conductive balls 32*a* that are in contact with respective electrical contacts (not shown) disposed on the upper surface 21*a* of the PCB 21. The ASIC package 22 communicates with the PCB 21 through these electrical connections. Electrically-conductive input/output (I/O) pads (not shown) disposed on a lower surface of the ASIC package 22 are in contact with respective electrically-conductive contact pads (not shown) disposed on an upper surface 31*a* (FIG. 5) of the organic substrate 31. The ASIC package 22 communicates with the organic substrate 31 through these electrical connections. Electrically-conductive contacts 33 (FIGS. 6 and 7) disposed on the upper surface 31*a* of the organic substrate 31 near a front edge 34 of the organic substrate 31 are connected to ends of electrically-conductive lines and/or vias (not shown) running through the substrate 31 and have the same pitch as those electrically-conductive lines and/or vias. This feature allows the electrical contacts 33 (FIGS. 6 and 7) to have the same pitch as the pitch between adjacent I/O pads 35 (FIGS. 6 and 7) of the driver ICs 7 and 8.

Also, in accordance with this illustrative embodiment, the upper surface 31*a* (FIGS. 6 and 7) of the organic substrate 31 is coplanar with the upper surfaces 7*a* and 8*a* (FIGS. 6 and 7) of the driver ICs 7 and 8. The leveling device 27 (FIGS. 6 and 7) is secured to the PCB 21 and has a heat exchanging portion 27*a* and a leveling portion 27*b*. The heat exchanging portion 27*a* is in contact with the upper surface 22*a* of the ASIC package 22 (FIG. 5) for conducting heat away from the ASIC package 22. The leveling portion 27*b* (FIGS. 6 and 7) extends downwardly and outwardly from the heat exchanging portion 27*a* toward the front edge 34 (FIGS. 6 and 7) of the organic substrate 31. The leveling portion 27*b* has a lower surface 27*c* (FIGS. 6 and 7) that is in contact with the upper surface 31*a* of the organic substrate 31 and with an upper surface 4*a* (FIGS. 6 and 7) of the first lead frame 4.

The leveling portion 27*b* has a lower surface 27*c* that is in contact with the upper surface 4*a* of the first lead frame 4, as shown in FIGS. 6 and 7, and with the upper surface 31*a* of the organic substrate 31, which ensures that the surfaces 4*a* and 31*a* are coplanar with the upper surfaces 7*a* and 8*a* of the driver ICs 7 and 8, respectively. In accordance with this illustrative embodiment, the leveling portion 27*b* has chamfered thru holes 27*d* formed in it that allow the leveling portion 27*b* to be laser welded to the first lead frame 4. Electrically-conductive ribbon bonds 36 (FIGS. 6 and 7) are connected on first ends to the contacts 33 of the substrate 31 and on second ends to the I/O pads 35 of the driver ICs 7 and 8. Because the electrical contacts 33 (FIG. 7) are very close to the I/O pads 35, are located in the same plane as the I/O pads 35 and have the same pitch as the I/O pads 35, the ribbon bonds 36 can be kept very short. In the illustrative embodiment shown in FIGS. 6 and 7, the front edge 34 of the organic substrate 31 extends away from a front edge 21*b* of the PCB 21 to shorten the distance between the contacts 33 and the I/O pads 35. This further reduces the lengths of the ribbon bonds 36.

Ribbon bonds have a larger perimeter than typical wire bonds. The larger perimeter of the ribbon bonds gives them an inductance that is lower than the inductance associated with typical wire bonds. The lower inductance results in less impedance mismatch between the interconnected devices, which leads to improvements in signal integrity. Ribbon bonds are created using a device known as a wedge bonder. Wedge bonders have difficulty forming ribbon bonds when the contacts that the ribbon bonds are interconnecting are in different planes. Because the upper surfaces of the organic substrate 31 and the driver ICs 7 and 8 are in the same plane, the ribbon bonds 36 (FIG. 7) can be formed in the known manner using a wedge bonder (not shown).

Also, in accordance with this illustrative embodiment, the ribbon bonds 36 (FIG. 7) are not only very short, but are also straight and of equal length, all of which help in maintaining good signal integrity. In addition, the organic substrate 31 is of much higher quality than a typical PCB and can achieve smaller conductor line width with better tolerance control during the manufacturing process compared to PCB manufacturing processes. This also leads to better impedance matching, which leads to further improvements in signal integrity. In accordance with this illustrative embodiment, the laser diodes and PIN diodes 13-16 are connected by ribbon bonds 37 to I/O pads of the driver ICs 7 and 8 and the upper surfaces of the driver ICs 7 and 8 and of the laser diodes and PIN diodes 13-16 are coplanar.

Figure 8:
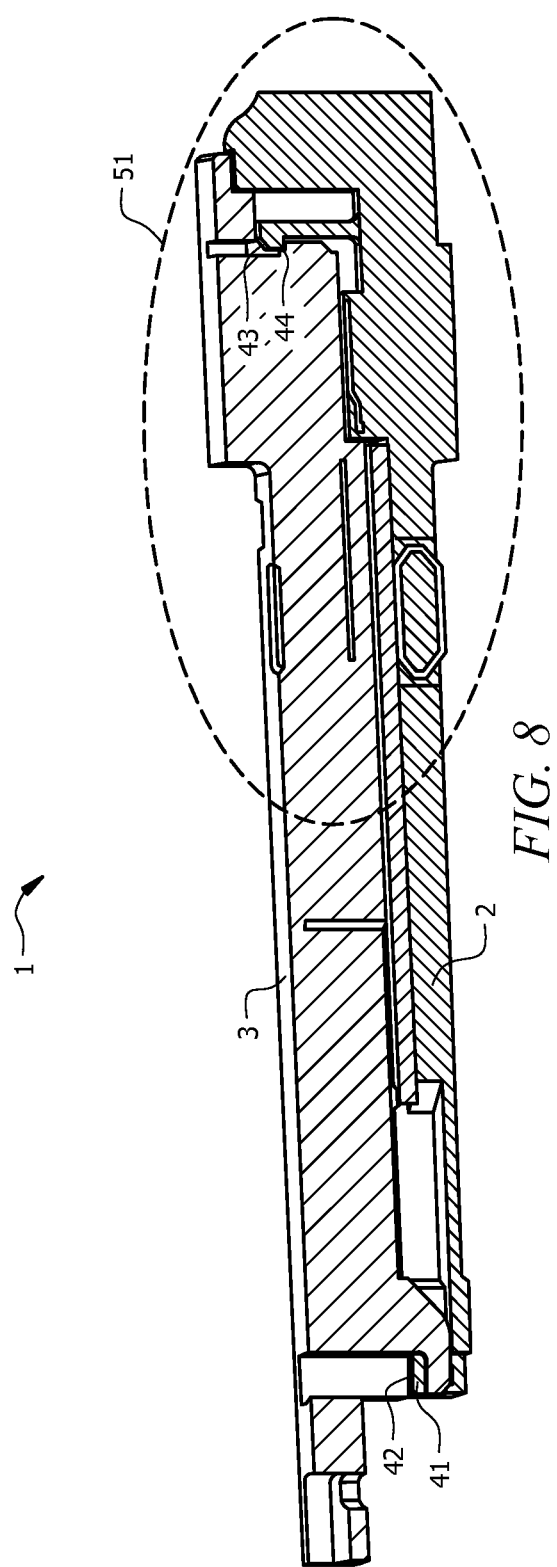
FIG. 8 illustrates a side perspective view of the optical communications module shown in FIG. 1 with the latching/delatching mechanism removed.

FIG. 8 illustrates a side perspective view of the optical communications module 1 shown in FIG. 1 with the latching/delatching mechanism 10 removed. The lower and upper housing portions 2 and 3 are configured to be snapped together to provide a temporary engagement between the portions 2 and 3 prior to fixedly securing them to one another with an adhesive material. The lower housing portion 2 has male pivot features 41 formed on opposite sides thereof for pivotally engaging respective female pivot features 42 disposed on opposite sides of the upper housing portion 3. Once the upper housing portion 3 has been pivotally engaged with the lower housing portion 2, the upper housing portion 3 is pivoted toward the lower housing portion 2 until snap features 43 and 44 disposed on opposite sides of the lower and upper housing portions 2 and 3, respectively, engage one another.

Figure 9:
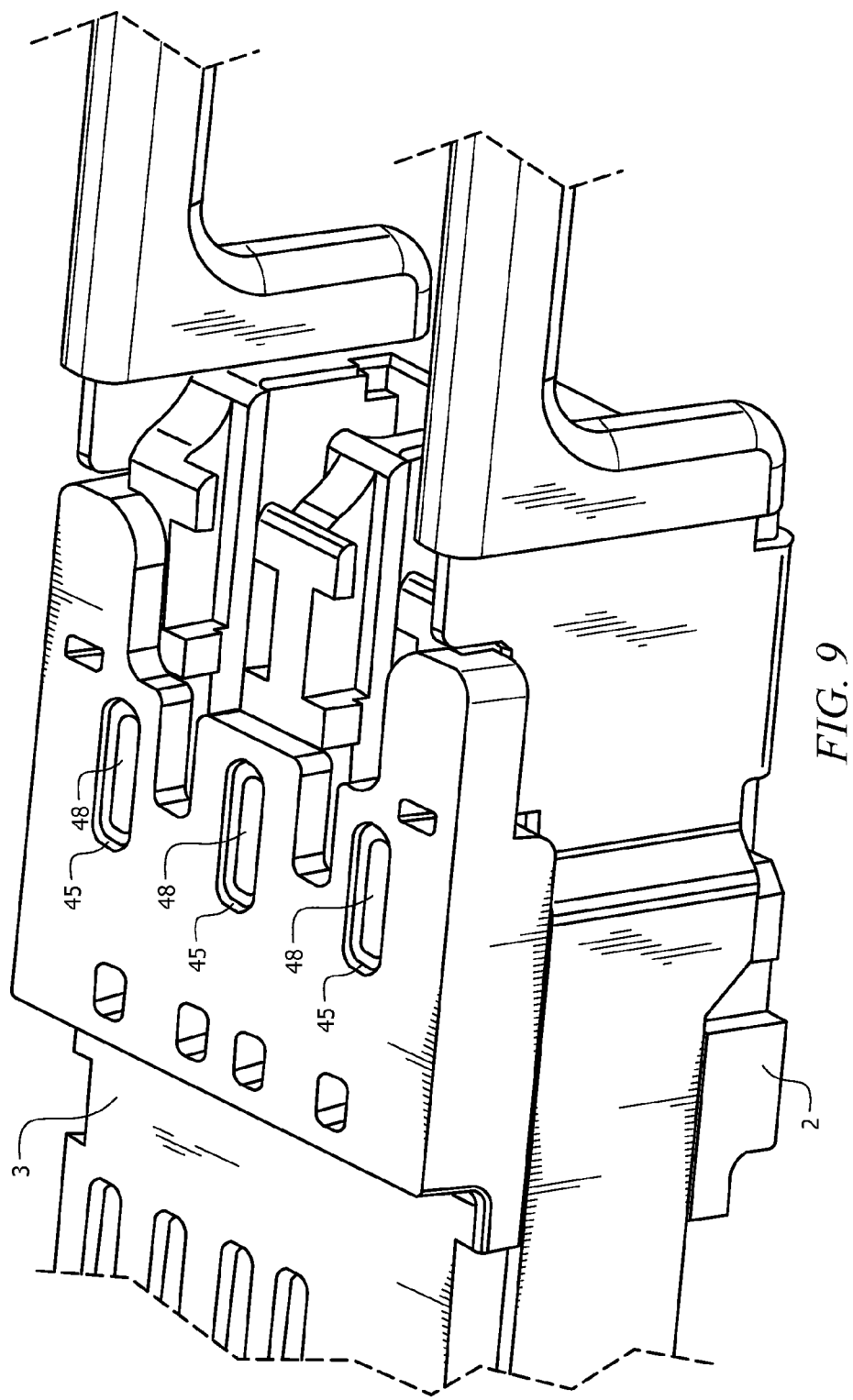
FIG. 9 illustrates a top perspective view of the portion of the optical communications module shown in FIG. 1 inside dashed circle 47 illustrating the holes formed in the upper housing portion filled with an adhesive material that fixedly secures the upper and lower housing portions to one another.

With reference again to FIGS. 1 and 5, holes 45 (FIG. 1) formed in the upper housing portion 3 receive ribs 46 (FIG. 5) formed on the lower housing portion 2 to form three double sheer joints. An adhesive material such as epoxy is then injected into the holes 45. FIG. 9 illustrates a top perspective view of the portion of the module 1 shown in FIG. 1 inside dashed circle 47 illustrating the holes 45 filled with an adhesive material 48. The snapped engagement between the lower and upper housing portions 2 and 3 described above with reference to FIG. 8 holds them together until the adhesive material 48 is cured. The cured adhesive material 48 fixedly secures the lower and upper housing portions 2 and 3 together.

As indicated above, in accordance with an illustrative embodiment, convection heat transfer is used in combination with the other heat dissipation features described above to further ensure that the temperature of the laser diodes 13 and 14 does not increase to the point that their performance is adversely affected. The manner in which the module 1 provides convection heat transfer will now be described with reference to FIGS. 10 and 11.

Figure 10:
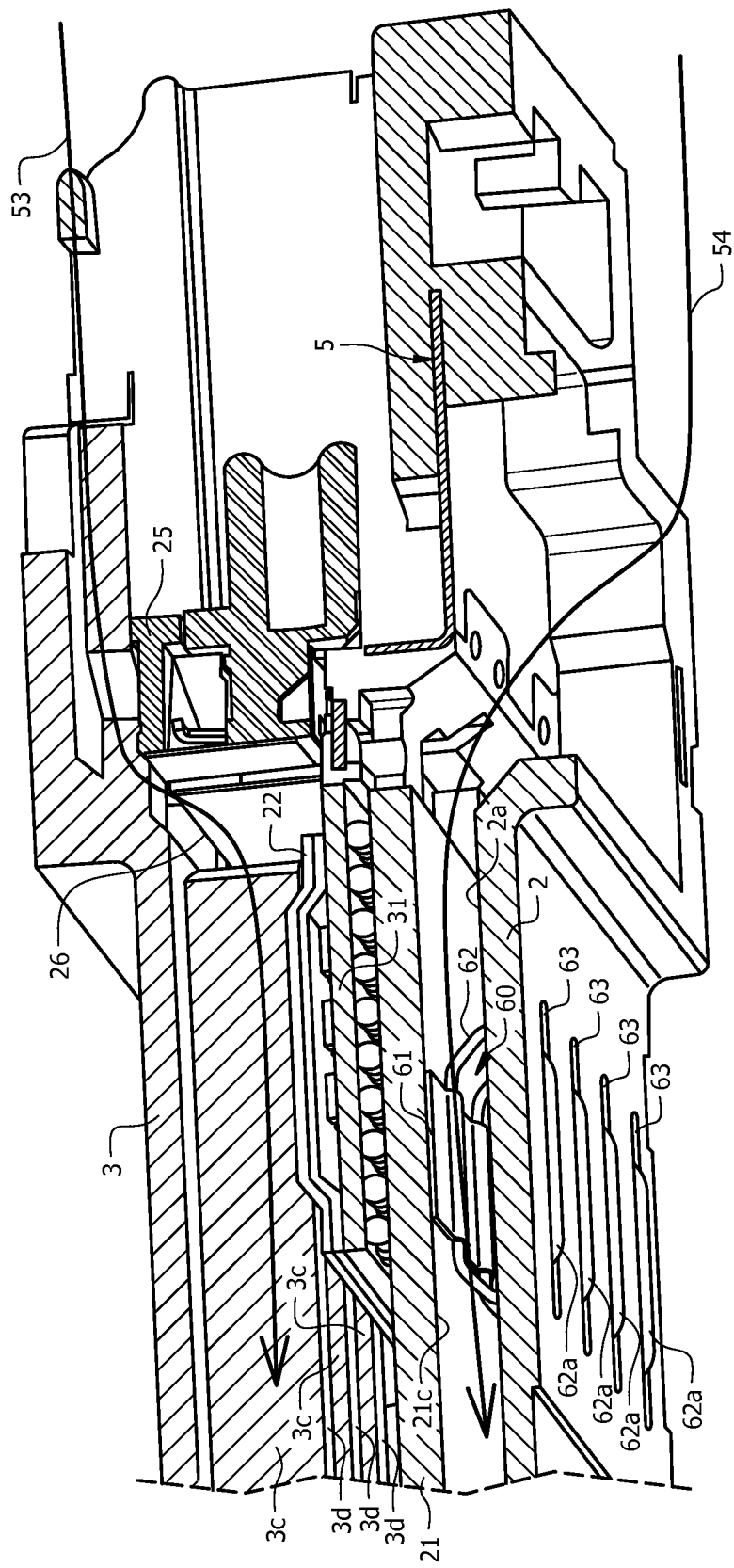
FIG. 10 illustrates a side cross-sectional view of the portion of the optical communications module inside of the dashed circle labeled with reference numeral 51 in FIG. 8 taken along line A-A' of FIG. 1.
Figure 11:
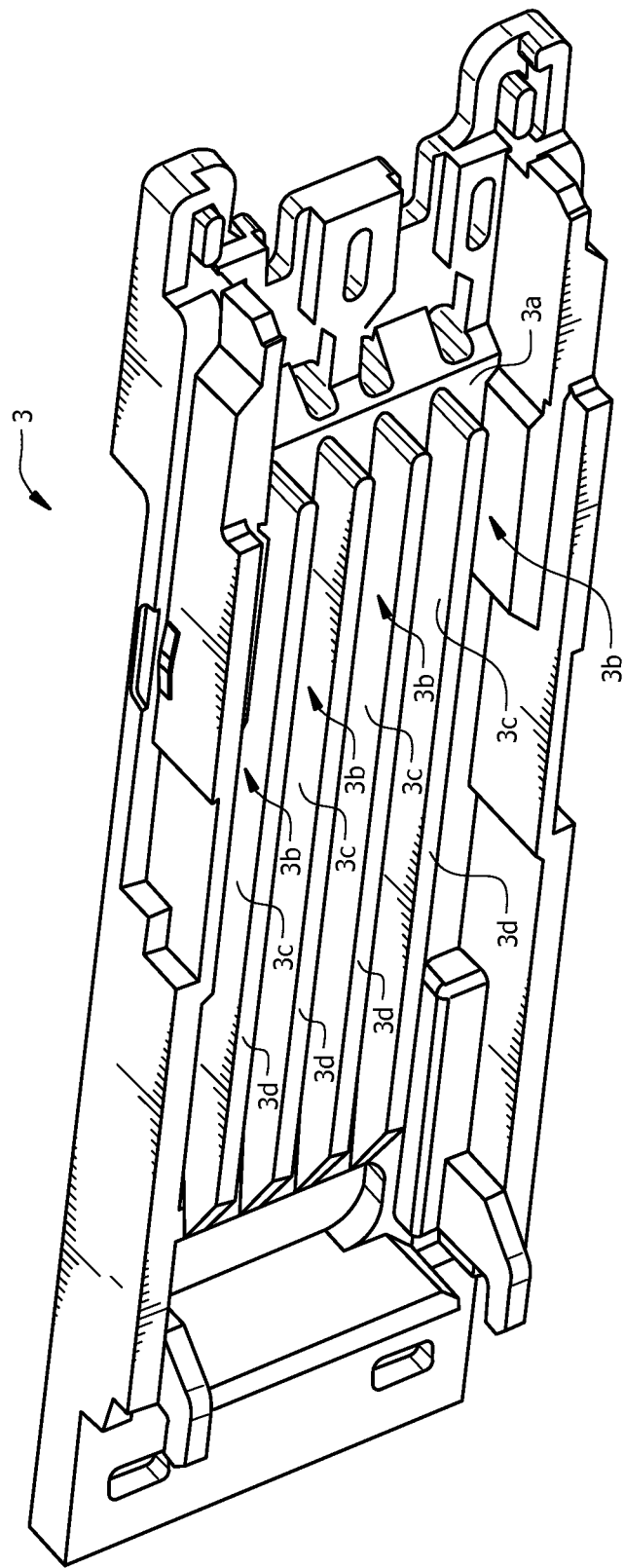
FIG. 11 illustrates a bottom perspective view of the upper housing portion of the optical communications module shown in FIG. 1.

FIG. 10 illustrates a side cross-sectional view of the portion of the module 1 inside of the dashed circle labeled with reference numeral 51 in FIG. 8 taken along line A-A' in FIG. 1. FIG. 11 illustrates a bottom perspective view of the upper housing portion 3 of the module 1 shown in FIG. 1. In accordance with this illustrative embodiment, the configuration of the module 1 allows air to flow in the directions indicated by arrows 53 and 54 (FIG. 10) through the module 1. The air flow path represented by arrow 53 flows across a portion of the first lead frame 4 (FIG. 7), over driver ICs 7 and 8, over the ASIC package 22 (FIG. 5), over portions of the PCB 21 and components mounted on the upper surface thereof, and through channels 3b defined by cooling fins 3c of the metal upper housing portion 3 (FIGS. 10 and 11). For ease of illustration, the leveling device 27 is not shown in FIGS. 10 and 11.

The air flow path represented by arrow 54 flows across the lower surface of the second lead frame 5 (FIG. 10). The air flow paths represented by arrows 53 and 54 are isolated from one another. In other words, all, or at least most, of air from the air flow path represented by arrow 53 does not enter the air flow path represented by arrow 54, and vice versa. The air flow paths 53 and 54 are "isolated," as that term is used herein, in that the air flow paths 53 and 54 do not intersect one another.

In order to provide the air flow path represented by arrow 53, space is needed between an upper inner surface 3a (FIG. 11) of the upper housing portion 3 and the upper surfaces of the PCB 21 and ASIC package 22. Similarly, in order to provide the air flow path represented by arrow 54, space is needed between a lower inner surface 2a (FIG. 10) of the lower housing portion 2 and a lower surface 21c of the PCB 21. To make space for the air flow path represented by arrow 53, the upper housing portion 3 has channels 3b (FIG. 11) formed therein that are defined by pairs of cooling fins 3c (FIG. 11) that extend downwardly from the inner upper surface 3a of the upper housing portion 3 and run in the lengthwise direction of the upper housing portion 3.

Bottom edges 3d (FIGS. 10 and 11) of the cooling fins 3c abut the top surface of the ASIC package 22 if the leveling device 27 is not used and they abut the top surface of the heat exchanging portion 27a of the leveling device 27 (FIG. 6) if the leveling device 6 is used. In some embodiments, the leveling device 27 may not be needed. If the leveling device 27 is used, the heat exchanging portion 27a (FIG. 6) transfers heat generated by the ASIC package 22 into the cooling fins 3c of the upper housing portion 3. If the leveling device 27 is not used, heat generated by the ASIC package 22 is transferred directly into the cooling fins 3c of the upper housing portion 3. Heated air flowing along the air flow path represented by arrow 53 in channels 3b is also transferred into the upper housing portion 3.

When the PCB 21 is mounted in the lower housing portion 2, mounting features (not shown) of the lower housing portion 2 space the lower surface 21a of the PCB 21 a distance away from the lower inner surface 2a of the lower housing portion 2. An air gap exists in this space that provides room for the air flow path represented by arrow 54.

The thermal decoupling of the driver ICs 7 and 8 from the laser diodes 13 and 14 that is achieved by spatially separating the lead frames 4 and 5 from one another and the convection heat transfer achieved by isolating the air flow paths 53 and 54 from one another provide a heat management solution for the module 1 that ensures that the temperatures of the laser diodes 13 and 14 do not rise to the point that their performance is adversely affected. In this way, the heat management solution ensures that the laser diodes 13 and 14 can be successfully operated at high speeds.

As indicated above, in accordance with an illustrative embodiment, the module 1 is provided with EMI shielding features for limiting the amount of EMI that escapes from the module 1. The EMI shielding features will now be described with reference to FIGS. 10 and 12-14.

As shown in FIG. 10, a wire form EMI shielding device 60 is secured by a clip 61 to the lower surface 21c of the PCB 21. The wire form EMI shielding device 60 comprises a plurality of wire loops 62 that are connected to the electrical ground (not shown) of the PCB 21. When the lower housing portion 2 is made of plastic, which is transparent to EMI, some type of EMI solution is needed to prevent EMI from passing through the lower housing portion 2. The wire form EMI shielding device 60 provides such a solution and, at the same time, does not block the air flow path represented by arrow 54. The air flowing along the air flow path represented by arrow 54 flows across the lower surface of the second lead frame 5 (FIG. 7) to draw heat generated by the laser diodes 13 and 14 away from the second lead frame 5. The lower housing portion 2 has slots 63 formed therein through which lower portions 62a of the respective wire loops 62 pass.

Figure 12:
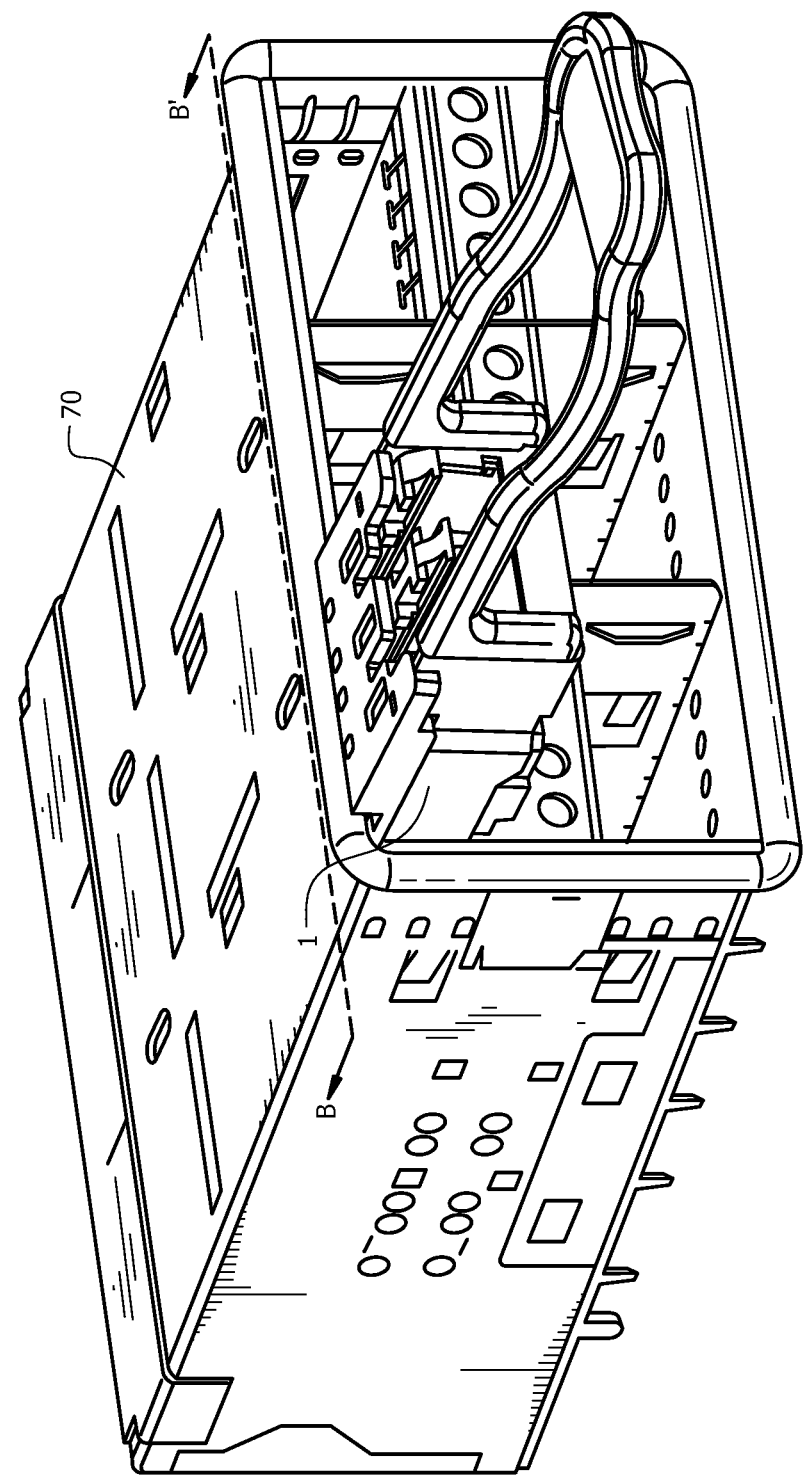
FIG. 12 illustrates a perspective view of a metal cage having the optical communications module shown in FIG. 1 lodged in an opening thereof.
Figure 13:
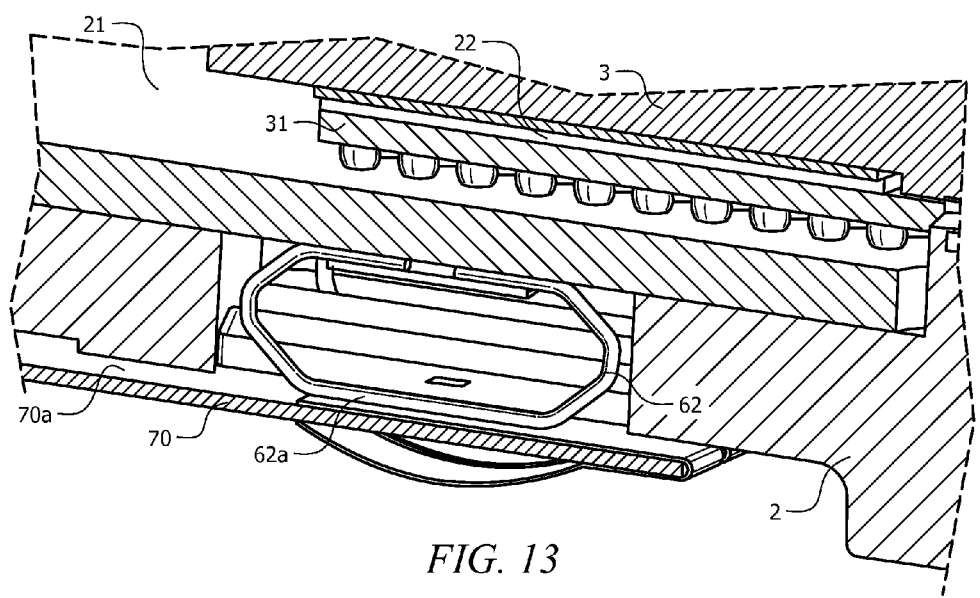
FIG. 13 illustrates an enlarged cross-sectional side view of the optical communications module shown in FIG. 1 lodged inside of the opening formed in the cage shown in FIG. 12.

FIG. 12 illustrates a perspective view of a metal cage 70 having the module 1 shown in FIG. 1 lodged in an opening thereof. FIG. 13 illustrates an enlarged cross-sectional side view of the module 1 shown in FIG. 1 lodged inside of the opening formed in the cage 70 shown in FIG. 12. When the module 1 shown in FIG. 1 is lodged inside of the opening of the cage 70, the lower portions 62a (FIG. 13) of the wire loops 62 are in contact with an inner lower surface 70a (FIG. 13) of the cage 70. The wire form EMI shielding device 60 limits the amount of EMI that escapes from the module 1 through the lower housing portion 2 to acceptable or required levels.

Figure 14:
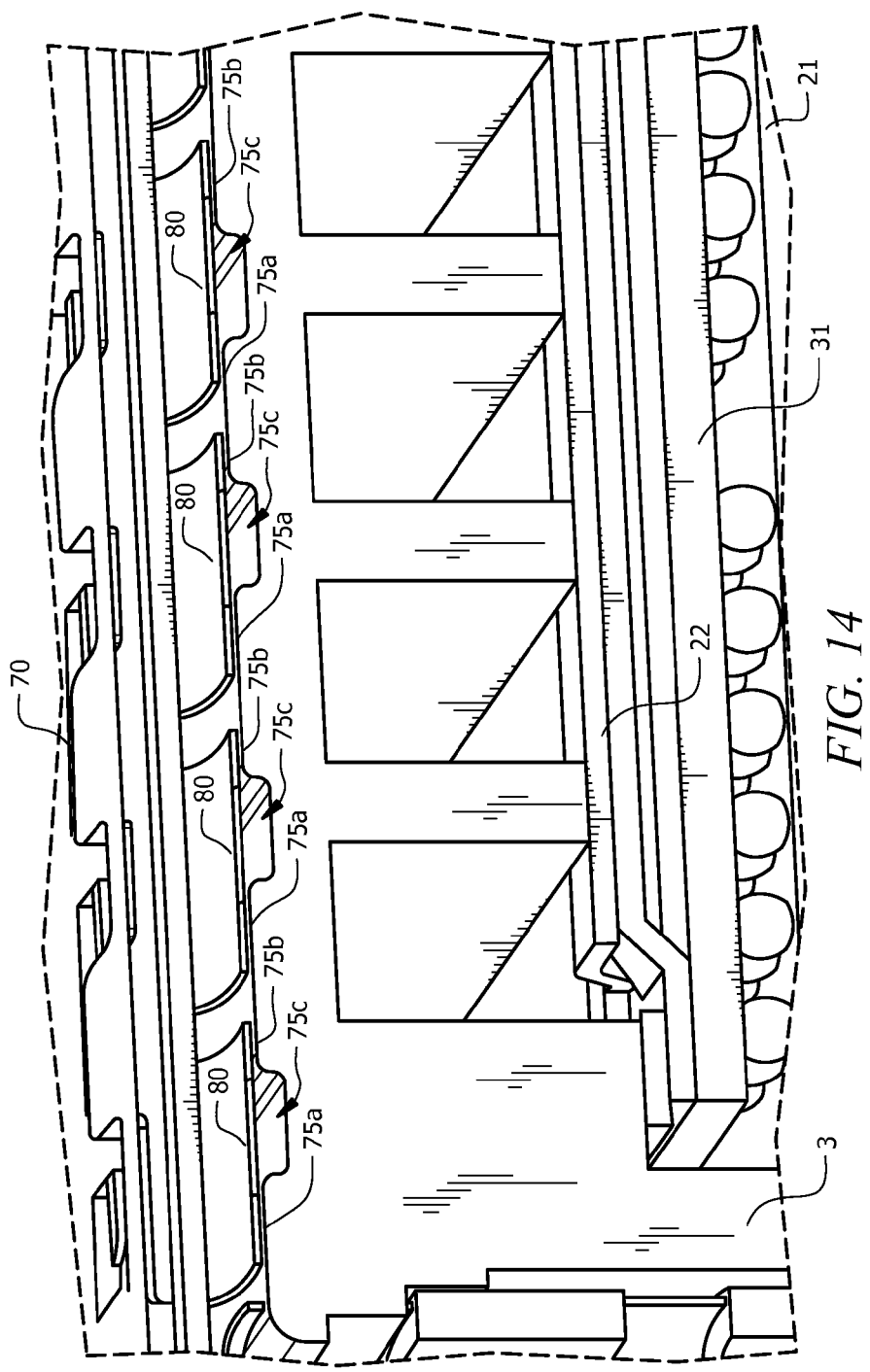
FIG. 14 illustrates an expanded cross-sectional front view of the optical communications module lodged inside of the opening of the cage shown in FIG. 12 taken along line B-B'.

An EMI shielding solution that limits the amount of EMI that escapes through the opening in the front of the cage 70 will now be described with reference to FIG. 14. FIG. 14 illustrates an enlarged cross-sectional front view of an upper portion of the cage 70 having the module 1 disposed therein, as shown in FIG. 12, taken along line B-B'. The cage 70 has EMI fingers 80 (FIG. 14) disposed around the opening of the cage 70 that make contact with the upper housing portion 3 when the module 1 is latched inside of the cage 70. The upper housing portion 3 is electrically coupled (not shown) to the electrical ground of the PCB 21. The contact between the upper housing portion 3 and the EMI fingers 80 of the cage 70 provides an EMI shielding structure that limits the amount of EMI that is allowed to escape from the front of the cage 70 through the cage opening. To increase EMI shielding efficiency, the outer surface of the upper housing portion 3 has contact points 75a and 75b separated by grooves 75c. The positioning and size of the grooves 75c is preselected to ensure that each EMI finger 80 makes contact with the upper housing portion 3 in two places, i.e., on each side of one of the respective grooves 75c. In this way, the grooves 75c double the density of contact points between the upper housing portion 3 and the EMI fingers 80.

In known systems in which optical communications modules are inserted into openings formed in cages, EMI fingers are often disposed on either the outside of the module housing or on the inside of the cage for providing an EMI shield about the cage opening. In such systems, there is typically only a single contact point per EMI finger. It is known that increasing the density of the contact points provides better EMI shielding, but efforts to increase the density of the contact points have generally focused on increasing the number of EMI fingers and/or reducing the pitch between adjacent EMI fingers. However, increasing the number of EMI fingers or reducing the pitch between adjacent EMI fingers presents challenges in manufacturing, especially in higher frequency applications.

The grooves 75c accomplish the objective of doubling the density of the contact points with a solution that is easily manufactured. As indicated above, the upper housing portion 3 is typically manufactured by a metal casting process. The grooves 75c are easily formed during the casting process. Manufacturing processes other than casting (e.g., stamping, embossing, etc.) may instead be used to form the grooves 75c.

It should be noted that although the illustrative embodiment shown in FIG. 14 depicts one pair of contact points 75a and 75b per EMI finger 80, the number of grooves 75c can be increased and the widths of the grooves 75c can be decreased to increase the number of contact points to more than two per EMI finger 80. Also, the EMI fingers 80 can be made smaller in width and/or the pitch between the EMI fingers 80 can be decreased to further increase the number of contact points per EMI finger. It should also be noted that the EMI fingers 80 could instead be part of the upper housing portion 3 and the grooves 75c could be formed in the inner surfaces of the cage 70 to accomplish the same objective of providing multiple contact points per EMI finger.

The optical communications module 1 in accordance with the illustrative embodiment has a form that is generally characteristic of small form factor pluggable (SFP), quad SFP (QSFP), C form factor pluggable (CFP), CXP, etc., configurations: an elongated, rectangular shape and first and second optical receptacles 91 and 92 (FIG. 2) at the forward end that are configured to mate with LC plugs or similar optical connectors (not shown) disposed on ends of first and second optical fiber cables. The laser diode 13 (FIG. 6) and the PIN diode 15 (FIG. 6) emit and detect optical data signals, respectively, that are transmitted and received, respectively, over the optical fiber cable (not shown) that is mated with receptacle 91. Likewise, the laser diode 14 (FIG. 6) and the PIN diode 16 (FIG. 6) emit and detect optical data signals, respectively, that are transmitted and received, respectively, over the optical fiber cable that is mated with receptacle 92. It should be noted that light sources other than laser diodes 13 and 14 and light detectors other than PIN diodes 15 and 16 may be used in the optical communications module.

Each of the optics devices 25 (FIG. 5) and 26 (FIG. 5) is configured to couple light produced by the respective laser diodes 13 (FIG. 6) and 14 (FIG. 6) into the respective optical fiber cables and to couple light received over the respective optical fiber cables onto the respective PIN diodes 15 (FIG. 6) and 16 (FIG. 6). Each of the optics devices 25 and 26 is also configured to couple a small portion of the light generated by the laser diodes 13 and 14 onto the feedback monitoring diodes 11 and 12, respectively.

The optics devices 25 (FIG. 5) and 26 (FIG. 5) and the optical operations performed thereby are disclosed in U.S. application Ser. No. 14/526,320, filed on Oct. 28, 2014, entitled "OPTICAL TRANSCEIVER HAVING OPTICS WITH ROTATED OPTICAL PATH," which is assigned to the assignee of the present application and which is incorporated by reference herein in its entirety. In the interest of brevity, a detailed description of the optics devices 25 and 26 and the operations that they perform will not be described in detail herein in the interest of brevity. It should be noted, however, that the invention is not limited with respect to the types or configurations of the optics devices that are used in the optical communications module 1.

It should be noted that the invention has been described with respect to illustrative embodiments for the purpose of describing the principles and concepts of the invention. The invention is not limited to these embodiments. For example, while the invention has been described with reference to a particular optical communications module configuration, the invention may be used in any optical communications module configuration that can benefit from the use of one or more of the signal integrity, heat dissipation and EMI shielding features described herein. As will be understood by those skilled in the art in view of the description being provided herein, many modifications may be made to the embodiments described herein while still achieving the goals of the invention, and all such modifications are within the scope of the invention.

What is claimed is:

1. An optical communications module comprising:
    upper and lower housing portions mechanically coupled with one another to provide a module housing;
    a first lead frame fixedly positioned in the module housing;
    at least a first light source driver circuit mounted on a first mounting surface of the first lead frame;
    a second lead frame fixedly positioned in the module housing and spatially separated from the first lead frame, wherein a first air flow path flows across at least a portion of the first lead frame;
    at least a first light source mounted on the second lead frame, wherein a second air flow path flows across at least a portion of the second lead frame, and wherein the first and second air flow paths are isolated from one another; and
    at least a first electrical interconnection electrically interconnecting the first light source driver circuit and the first light source, wherein the spatial separation of the first and second lead frames from one another and direct cooling of the first and second lead frames provided by the air flow paths provide a heat dissipation solution for the module;
    a printed circuit board (PCB) fixedly positioned in the module housing;
    an organic substrate mounted on the upper surface of the PCB and electrically interconnected with the PCB, and wherein the organic substrate is electrically connected to the first light source driver circuit; and
    at least a first integrated circuit (IC) mounted on and electrically interconnected with the organic substrate to enable communication between the first IC and the first light source driver circuit, the organic substrate mechanically coupling the first IC to the upper surface of the PCB, wherein the first air flow path also flows across the first IC and across at least a portion of the upper surface of the PCB, and wherein the second air flow path also flows across a lower surface of the PCB.

2. The optical communications module of claim 1, wherein the first air flow path also flows across at least a portion of the first light source driver circuit.

3. The optical communications module of claim 1, wherein the spatial separation of the first lead frame from the second lead frame and the first and second air flow paths comprise a heat management solution for the optical communications module that thermally decouples the first light source driver circuit from the first light source.

4. The optical communications module of claim 1, wherein the lower housing portion is made of a plastic material, and wherein the first and second lead frames are embedded in the plastic material.

5. The optical communications module of claim 4, wherein the upper housing portion is made of a metallic material, and wherein a side of the upper housing portion facing the PCB has channels formed therein defined by walls that extend in a downward direction from an upper inner surface of the first housing portion toward the upper surface of the PCB and that extend in a lengthwise direction that is parallel to at least a portion of the first air that flows across said portion of the upper surface of the PCB, and wherein the channels provide space in the module housing to allow the first air flow path to flow through the module housing.

6. The optical communications module of claim 4, further comprising:
    a first electromagnetic interference (EMI) shielding structure in contact with a lower surface of the PCB and with the lower housing portion.

7. The optical communications module of claim 6, wherein the first EMI structure includes a plurality of wire loops made of a metallic material, and wherein the lower housing portion has a plurality of slots formed therein, and wherein a portion of each wire loop extends through a respective one of the slots and is outside of the module housing.

8. The optical communications module of claim 7, wherein the module housing is shaped and sized to be received in an opening formed in a metal cage, and wherein when the module housing has been received in the cage opening, the portions of the wire loops that are outside of the module housing are in contact with an inner surface of the cage.

9. The optical communications module of claim 1, wherein the upper housing portion is made of a metallic material, and wherein the upper housing portion has a plurality of grooves formed in an outer surface thereof, said outer surface of the upper housing portion having a pair of first and second contact points on opposite sides of each groove, wherein the module housing is shaped and sized to be received in an opening formed in a metal cage, and wherein when the module housing has been received in the cage opening, a plurality of electromagnetic interference (EMI) fingers of the cage that extend into the cage opening come into contact with the first and second contact points such that each EMI finger is in contact with a respective pair of the first and second contact points.

10. The optical communications module of claim 9, wherein each pair of first and second contact points lies in a plane that is different from a plane in which the respective groove lies.

11. The optical communications module of claim 1, wherein the organic substrate has a plurality of electrical conductors therein and has a plurality of electrical contact pads disposed on an upper surface thereof, the electrical contact pads of the organic substrate being connected to the electrical conductors of the organic substrate, the optical communications module further comprising:
    a plurality of electrically-conductive bonds, each bond having a first end that is connected to one of the electrical contact pads of the organic substrate and a second end that is connected to a respective electrical contact pad of the light source driver circuit.

12. The optical communications module of claim 11, wherein a pitch between adjacent electrical conductors of the organic substrate is equal to a pitch between respective adjacent electrical contact pads of the organic substrate to which the adjacent electrical conductors are connected.

13. The optical communications module of claim 12, wherein the pitch between the respective adjacent electrical contact pads of the organic substrate is equal to a pitch between adjacent electrical contact pads of the first light source driver circuit and is equal to a pitch between adjacent electrically-conductive bonds of the plurality of electrically-conductive bonds.

14. The optical communications module of claim 13, wherein the electrically-conductive bonds are electrically-conductive ribbon bonds.

15. The optical communications module of claim 11, wherein the electrically-conductive bonds are electrically-conductive ribbon bonds, and wherein a plane in which the electrical contact pads of the first light source driver circuit lies is coplanar with a plane in which the electrical contact pads of the organic substrate lie.

16. An optical communications module comprising:
a module housing;
a printed circuit board (PCB) fixedly positioned in the module housing;
an organic substrate mounted on an upper surface of the PCB and electrically interconnected with the PCB, the organic substrate having a plurality of electrical conductors therein and having a plurality of electrical contact pads disposed on an upper surface thereof, the electrical contact pads of the organic substrate being connected to the electrical conductors of the organic substrate;
at least a first integrated circuit (IC) mounted on the upper surface of the organic substrate and electrically interconnected with the organic substrate;
a lead frame fixedly positioned in the module housing;
at least a first light source driver circuit mounted on a first mounting surface of the lead frame;
at least a first light source mounted on a second mounting surface of the lead frame and electrically interconnected with the first light source driver circuit; and
a plurality of electrically-conductive bonds, each bond having a first end that is connected to one of the electrical contact pads of the organic substrate and a second end that is connected to a respective electrical contact pad of the light source driver circuit.

17. The optical communications module of claim 16, wherein a pitch between adjacent electrical conductors of the organic substrate is equal to a pitch between respective adjacent electrical contact pads of the organic substrate to which the adjacent electrical conductors are connected.

18. The optical communications module of claim 17, wherein the pitch between the respective adjacent electrical contact pads of the organic substrate is equal to a pitch between adjacent electrical contact pads of the first light source driver circuit and is equal to a pitch between adjacent electrically-conductive bonds of the plurality of electrically-conductive bonds.

19. The optical communications module of claim 18, wherein the electrically-conductive bonds are electrically-conductive ribbon bonds.

20. The optical communications module of claim 16, wherein the electrically-conductive bonds are electrically-conductive ribbon bonds, and wherein a plane in which the electrical contact pads of the first light source driver circuit lies is coplanar with a plane in which the electrical contact pads of the organic substrate lie.

21. The optical communications module of claim 20, wherein the electrically-conductive ribbon bonds are of equal length.

22. The optical communications module of claim 21, wherein the electrical contact pads of the organic substrate are located near an edge of the organic substrate that is nearer than any other edge of the organic substrate to the first light source driver circuit.

23. The optical communications module of claim 16, wherein the lead frame comprises a first lead frame portion and a second lead frame portion that are spatially separated from one another, the first mounting surface being on the first lead frame portion and the second mounting surface being on the second lead frame portion.

24. The optical communications module of claim 23, wherein the module housing comprises a first housing portion and a second housing portion that are mechanically coupled with one another, the second housing portion being made of a plastic material in which the lead frame is embedded.

25. An optical communications module comprising:
a module housing comprising a first housing portion and a second housing portion, the second housing portion being made of a metallic material and having a first electromagnetic interference (EMI) shielding structure formed therein, the first EMI structure comprising a plurality of grooves formed in an outer surface of the second housing portion, each groove having first and second contact points on opposite sides thereof, the grooves having a width and position that are preselected to space the respective first and second contact points a predetermined distance apart such that when the module housing is lodged in an opening formed in a metal cage, each of a plurality of electromagnetic interference (EMI) fingers of the metal cage come into contact with a respective pair of the first and second contact points; and
module components disposed in the module housing, one or more of the module components being operable to perform tasks associated with at least one of transmitting and receiving a data signal.

26. The optical communications module of claim 25, wherein the first housing portion is made of a plastic material.

27. The optical communications module of claim 26, wherein the module components comprise:
a first lead frame portion fixedly positioned in the module housing and embedded in the plastic material;
at least a first light source driver circuit mounted on a first mounting surface of the first lead frame portion;
a second lead frame portion fixedly positioned in the module housing and embedded in the plastic material, the first and second lead frame portions being spatially separated from one another;
at least a first light source mounted on the second lead frame portion; and
at least a first electrical interconnection electrically interconnecting the first light source driver circuit and the first light source, wherein the spatial separation of the first and second lead frame portions from one another thermally decouples the first lead frame portion from the second lead frame portion.

28. The optical communications module of claim 27, wherein the module components further comprise:
a printed circuit board (PCB) fixedly positioned in the module housing; and at least a first integrated circuit (IC) mounted on an upper surface of the PCB.

29. The optical communications module of claim 28, further comprising:
a second electromagnetic interference (EMI) shielding structure in contact with a lower surface of the PCB and with the first housing portion.

30. The optical communications module of claim 29, wherein the second EMI structure includes a plurality of wire loops made of a metallic material, and wherein the first housing portion has a plurality of slots formed therein, and wherein a portion of each wire loop extends through a respective one of the slots and is outside of the module housing.

31. The optical communications module of claim 30, wherein the module housing is shaped and sized to be received in an opening formed in a metal cage, and wherein when the module housing has been received in the cage opening, the portions of the wire loops that are outside of the module housing are in contact with an inner surface of the cage.

32. The optical communications module of claim 27, wherein a first air flow path flows across at least a portion of the first lead frame portion and wherein a second air flow path flows across at least a portion of the second lead frame portion, and wherein the first and second air flow paths are isolated from one another and draw heat away from the first and second lead frame portions, respectively.

33. An optical communications module comprising:
upper and lower housing portions mechanically coupled with one another to provide a module housing shaped and sized to be received in an opening formed in a metal cage, wherein the upper housing portion is made of a metallic material, and wherein the upper housing portion has a plurality of grooves formed in an outer surface thereof, said outer surface of the upper housing portion having a pair of first and second contact points on opposite sides of each groove, and wherein when the module housing has been received in the cage opening, a plurality of electromagnetic interference (EMI) fingers of the cage that extend into the cage opening come into contact with the first and second contact points such that each EMI finger is in contact with a respective pair of the first and second contact points;
a first lead frame fixedly positioned in the module housing;
at least a first light source driver circuit mounted on a first mounting surface of the first lead frame;
a second lead frame fixedly positioned in the module housing and spatially separated from the first lead frame, wherein a first air flow path flows across at least a portion of the first lead frame;
at least a first light source mounted on the second lead frame, wherein a second air flow path flows across at least a portion of the second lead frame, and wherein the first and second air flow paths are isolated from one another; and
at least a first electrical interconnection electrically interconnecting the first light source driver circuit and the first light source, wherein the spatial separation of the first and second lead frames from one another and direct cooling of the first and second lead frames provided by the air flow paths provide a heat dissipation solution for the module.

34. An optical communications module comprising:
upper and lower housing portions mechanically coupled with one another to provide a module housing, the upper housing portion being made of a metallic material and the lower housing portion being made of a plastic material, and wherein a side of the upper housing portion has channels formed therein defined by walls that extend in a downward direction from an upper inner surface of the first housing portion and that extend in a lengthwise direction that is parallel to at least a portion of a first air flow path, and wherein the channels provide space in the module housing to allow the first air flow path to flow through the module housing;
a first lead frame fixedly positioned in the module housing and embedded in the plastic material;
at least a first light source driver circuit mounted on a first mounting surface of the first lead frame;
a second lead frame fixedly positioned in the module housing, embedded in the plastic material of the lower housing portion and spatially separated from the first lead frame, wherein the first air flow path flows across at least a portion of the first lead frame;
at least a first light source mounted on the second lead frame, wherein a second air flow path flows across at least a portion of the second lead frame, and wherein the first and second air flow paths are isolated from one another;
at least a first electrical interconnection electrically interconnecting the first light source driver circuit and the first light source, wherein the spatial separation of the first and second lead frames from one another and direct cooling of the first and second lead frames provided by the air flow paths provide a heat dissipation solution for the module;
a printed circuit board (PCB) fixedly positioned in the module housing; and
at least a first integrated circuit (IC) mechanically coupled to on an upper surface of the PCB, wherein the first air flow path also flows across the first IC and across at least a portion of the upper surface of the PCB, and wherein the second air flow path also flows across a lower surface of the PCB.

* * * * *